(12) United States Patent
Sun et al.

(10) Patent No.: US 6,436,419 B1
(45) Date of Patent: Aug. 20, 2002

(54) ANTIMICROBIAL TREATMENT OF POLYMERS

(75) Inventors: Gang Sun; Young Hee Kim, both of Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/151,891

(22) Filed: Sep. 11, 1998

(51) Int. Cl.[7] .................. A01N 25/34; A01N 25/00; A01N 33/18
(52) U.S. Cl. .................. 424/404; 424/402; 424/405; 514/740
(58) Field of Search .................. 424/402, 403, 424/404, 405; 514/740

(56) References Cited

U.S. PATENT DOCUMENTS

| | | | |
|---|---|---|---|
| 3,817,702 A | | 6/1974 | Paulus et al. |
| 4,311,479 A | * | 1/1982 | Fenn et al. ............... 8/495 |
| 4,407,748 A | | 10/1983 | Gorbacheva et al. |
| 5,059,420 A | * | 10/1991 | Scholla et al. ............ 424/405 |
| 5,130,035 A | * | 7/1992 | Dell'Armo et al. ........ 252/8.6 |

FOREIGN PATENT DOCUMENTS

| FR | 1499788 A | 1/1968 |
|---|---|---|
| FR | 1 499 788 A | 1/1968 |
| JP | 47030988 | * 11/1972 |

OTHER PUBLICATIONS

Rigby, A.J., et al., "Medical textiles. Textile materials in medicine and surgery, " *Textile Horizons*, pp. 42–46 (Dec. 1993).

Payne, et al., "A Durable antiodor finish for cotton textiles," *Textile Research Journal*, 28(5):28–30 (1996).

Kim, et al., "Preparation of bis–quaternary ammonium salts from epichlorohydrin," *JAOCS*, 73(1):67–71 (1996).

Cho, J.S., et al., "Effect of a dual function finish containing an antibiotic and a fluorochemical on the antimicrobial properties and blood repellency of surgical gown materials," *Textile Res. J.*, 67(12):875–880 (1997).

* cited by examiner

*Primary Examiner*—Russell Travers
*Assistant Examiner*—Shengjun Wang
(74) *Attorney, Agent, or Firm*—Townsend and Townsend and Crew, LLP

(57) ABSTRACT

The present invention provides durable and refreshable antimicrobial polymers and methods for preparing the same. In some instances, the polymer is a textile. These textiles have excellent colorfastness and washfastness. The antimicrobial fabrics of this invention are suitable for sportswear, antiodor carpets, films, plastics, toys and medical uses.

33 Claims, 5 Drawing Sheets

ACID RED 88

ACID ORANGE 7

ACID VIOLET 87

ACID BLUE 113

ACID RED 18

ACID RED 88

ACID ORANGE 7

ACID VIOLET 87

ACID BLUE 113

ACID RED 18

DISPERSE BLUE 1

DISPERSE YELLOW 7

DISPERSE YELLOW 9

US 6,436,419 B1

ANTIMICROBIAL TREATMENT OF POLYMERS

BACKGROUND OF THE INVENTION

Antimicrobial materials such as fabrics, polymers and even children's toys have become increasingly popular due to public concerns over epidemiological diseases and pathogens. With respect to antimicrobial fabrics, domestic and international markets have grown significantly as a result of public awareness of these potential threats. (see, Center for Disease Control and Prevention, Infection Control and Biosafety, *Medical Data International. Report # RP*-701530, 1992; and A. J. Rigby, et al., *Textile Horizons,* December 1993, 42-46). Antimicrobial clothing can be used in medicine as well as other institutional uses for such applications as, surgeon's gowns, caps, masks, patient drapes, bandages, wipers and cover cloths of various sizes. (see, A. J. Rigby, et al. *Textile Horizons,* December 1993, 42-46).

Although the demand for antimicrobial textile materials is high, few of such textiles are available, especially ones that are effective against a broad spectrum of bacteria and, which are effective after multiple machine washes (see, Vigo, T. L., *Biotechnology and Bioactive Polymers,* Ed. C. Gebelein et al.; D. W. Kudner, *Textile Chemist and Colorist,* Vol. 28, No. 5, 1996, 28–30 and J. S. Cho, et al., *Textile Research Journal.* 67 (12), 1997, 875–880). Research and development of durable functional textiles has been active in recent years, with new methods of incorporating antibiotics as bactericidal agents into polymers being advanced. However, most of the antimicrobial functions have been achieved by using a slow-releasing model. This model works by leaching the biocidal active agent to the surface of the material thereby inactivating the microorganisms. However, this method limits the durability of the biocidal property, by not being regenerable in a convenient way.

Co-pending U.S. application Ser. No. 08/713,406, filed Sep. 13, 1996, describes durable and regenerable cellulose materials by using an innovative chemical finishing method. In that invention, treatment of cotton and polyester/cotton fabrics were finished by hydantoin derivatives, and biocidal properties were conferred by washing the treated fabrics with a chlorine laundry bleach. Chlorination of amide and imide bonds in hydantoin rings produce biocidal N-halamine sites. The N-halamine return to their precursor forms when the sites are exposed to microorganisms. The biocidal properties of the textiles can then be regenerated by using chlorine bleach. The major advantage of this chlorine regenerable finishing method are its durability, convenience and economy.

N-halamine chemistry however, is not applicable to colorized fabrics. The use of chlorine bleach decolorizes textiles. Thus, a non-bleach regenerating agent would be desirable for certain applications, especially for colored materials. Ideally for economic and convenience reasons, a regeneration process which uses water as the functional agent could be designed.

In view of the foregoing, there exists a need in the art for durable and regenerable microbicidal colored textiles. The present invention remedies such need by providing, inter alia, durable and regenerable microbicidal polymers and textiles.

SUMMARY OF THE INVENTION

The present invention provides durable and refreshable antimicrobial polymers, especially textiles, such as nylon and polyester fabrics and methods for preparing the same. These textiles have excellent colorfastness and washfastness. The antimicrobial polymers of this invention are suitable for sportswear, antiodor carpets, films, plastics and medical uses.

In one embodiment, the present invention relates to an antimicrobial polymer composition comprising: a) a polymer material having a colorant; and b) an antimicrobial agent attached to said colorant. The colorant can be a dye or a pigment. In one embodiment, the polymer is a textile, such as a fabric. In certain preferred aspects, colorants, such as dyes, are used as connectors, bridges or links, to firmly attach the microbicidal agents to the polymer. In other aspects, the dyes contain auxochromes, such as sulfonic, hydroxyl and amino groups that can be used to facilitate color shades and solubility requirements. The antimicrobial agents are amphipathic molecules. Preferably, the antimicrobial agents are quaternary ammonium salts.

In another embodiment, the present invention relates to a process for making a polymer antimicrobial comprising: a) dyeing a polymer with a colorant to form a polymer having the colorant attached thereto; and b) attaching a antimicrobial agent to the colorant, thereby making the polymer antimicrobial. The colorant can be a dye or a pigment.

After exposure to microorganisms, the antimicrobial polymers, especially textiles, can be regenerated by simply washing in water. These antimicrobial textiles are particularly useful for hygienic, medical and athletic apparel as well as antiodor fabric such as antiodor carpets.

In another embodiment, the antimicrobial agent can be attached to the polymer without the aid of a colorant. Other features, objects and advantages of the invention and its preferred embodiments will become apparent from the detailed description which follows.

DETAILED DESCRIPTION OF THE INVENTION

The present invention provides durable and refreshable antimicrobial polymers, such as plastics, films and textiles. The textiles include, but are not limited to, fibers, yarns or fabrics. These textiles have excellent colorfastness and washfastness. As such, the present invention relates to an antimicrobial polymer composition comprising: a) a polymer having a colorant; and b) an antimicrobial agent attached to said colorant. In a preferred embodiment, the polymer is a textile.

Textiles are among the most ubiquitous materials in society. The textiles suitable for the present invention include, but are not limited to, naturally occurring fibers from plants, such as cellulose, cotton, linin, hemp, jute and ramie. They include polymers from animals, based upon proteins and include, but are not limited to, wool, mohair, vicuna and silk. Textiles also include manufactured fibers based upon natural organic polymers such as, rayon, lyocell, acetate, triacetate and azlon. Textiles suitable for use in the present invention include synthetic organic polymers which include, but are not limited to, acrylic, aramid, nylon, olefin, polyester, spandex, vinyon, vinyl and graphite. Textiles also include inorganic substances such as glass, metallic and ceramic.

The polymeric plastics suitable for the present invention include thermoplastic or thermosetting resins. The thermoplastics include, but are not limited to, polyethylene, polypropylene, polystyrene, and polyvinylchloride. Thermoplastics also include, polyamideimide, polyethersulfone, polyarylsulfone, polyetherimide, polyarylate, polysulfone, polycarbonate and polystyrene. Additional thermoplastics include, but are not limited to, polyetherketone, polyetheretherketone, polytetrafluoroethylene, nylon-6,6, nylon-6,12, nylon-11, nylon-12, acetal resin, polypropylene, and high and low density polyethylene.

The terms "antimicrobial," "microbicidal," or "biocidal" as used herein, refer to the ability to kill at least some types of microorganisms, or to inhibit the growth or reproduction of at least some types of microorganisms. The polymers prepared in accordance with the present invention have microbicidal activity (antimicrobial) against a broad spectrum of pathogenic microorganisms. For example, if the polymer is a textile, the textiles have microbicidal activity against representative gram-positive (such as *Staphylococcus aureus*) and gram-negative bacteria (such as *Escherichia coli*). Moreover, the microbicidal activity of such textiles is readily regenerable.

Figure 1:
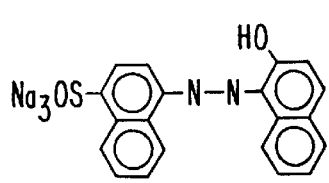
FIG. 1 illustrates examples of Acid dyes which are suitable for use in the present invention.
Figure 1:
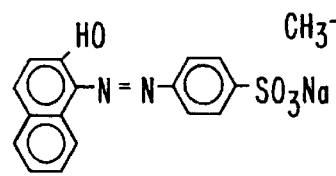
Figure 1:
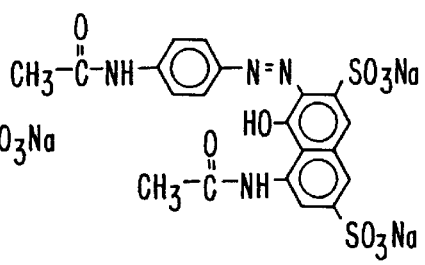
Figure 1:
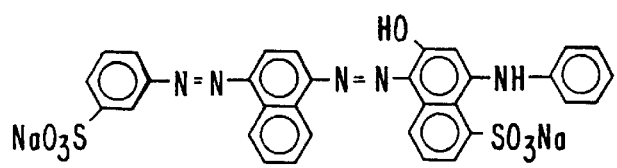
Figure 1:
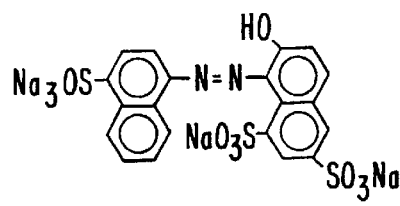

Colorants, such as dye molecules, are used as connectors or bridges between the textile and the antimicrobial agent. The dye molecules suitable for different synthetic polymers have excellent washfastness and durability. The dyes which can be used include, but are not limited to, an acid dye, a disperse dye, a direct dye and a reactive dye. In a preferred embodiment, an acid dye is used. Suitable acid dyes include, but are not limited to, Acid Black dye, an Acid Blue dye, an Acid Orange dye, an Acid Red dye, an Acid Violet dye, and an Acid Yellow dye. FIG. 1 lists various acid dyes suitable for use in the present invention.

Figure 2:
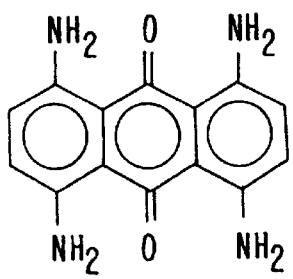
FIG. 2 illustrates examples of various disperse dye structures which are suitable for use in the present invention.
Figure 2:
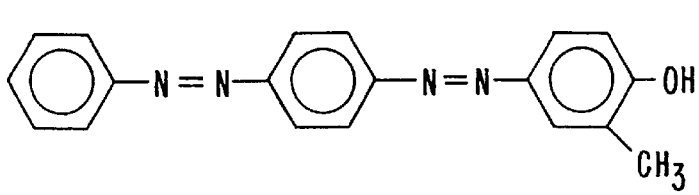
Figure 2:
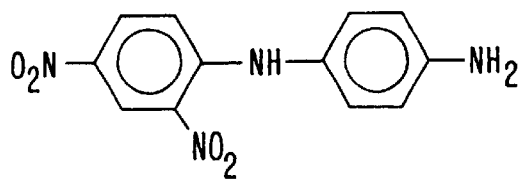

With reference to FIG. 2, various disperse dyes are suitable for use in the present invention. These disperse dyes include, but are not limited to, Disperse Blue 1, Disperse Yellow 7 and Disperse Yellow 9. Those skilled in the art will be aware of various other disperse dyes suitable for use in the present invention.

In one embodiment, acid dyes are preferably used with Nylon 66, Nylon 6, wool, and silk. In another embodiment, disperse dyes are used with Nylon 66, Nylon 6, Nomex, acetate, triacetate, acrylics, polyester, polypropylene, and blended fabrics. Disperse dyes are also suitable for use in plastic products, such as colored films, toys, computer keyboards and other polymeric products wherein a antimicrobial material is needed.

In certain embodiments, the colorants, such as dye molecules, also contain auxochromes, including, but not limited to, sulfonic groups, hydroxyl groups, quaternary groups and amino functional groups. These auxochromes facilitate the color and solubility requirements of the colorant. In addition, these reactive groups serve to anchor the microbicidal agent. The auxochromes of the dyes serve to chemically modify the polymers such as fibers. These dye molecules then serve as bridges by bringing functional groups onto the polymers, such as fibers, and then linking the biocidal agents. For example, a sulfonate group can form an ionic bond with a cationic species like a quaternary salt, or vice versa. In another example, an amino group and a hydroxyl group are reactive with alkyl halides, epoxide, and acetyl groups. Hence, the dye molecules act as bridges to bring functional groups onto polymers and thereby serving as a point of attachment for the biocidal agents.

As such, in one embodiment, the linkage between the colorant and the antimicrobial agent is an ionic bond formation between a sulfonate anion on an acid dye and an amphipathic molecule, such as a quaternary ammonium salt of a antimicrobial agent. In another embodiment, the linkage is a covalent bond between an amino or hydroxyl group on a disperse dye and an epoxy or alkyl halide structures of a antimicrobial agent. In both cases, quaternary ammonium salts are employed as the antimicrobial agent.

The antimicrobial agents of the present invention are amphipathic molecules. These amphipathic molecules contain both a hydrophilic portion and a hydrophobic portion. These amphipathic molecules include, but are not limited to, quaternary ammonium salts, glycolipids and phosphoglycerides. In a preferred embodiment, the antimicrobial agent is a quaternary ammonium salt (QAS). Some QAS are available commercially from Aldrich Chemical Co, Milwaukee, Wis. Suitable quaternary ammonium salts include, but are not limited to, dodecyltrimethyl ammonium bromide (DTAB), N-(3-chloro-2-hydroxypropyl)-N,N-dimethyldodecylammonium chloride, 1,3-Bis-(N,N-dimethyldodecylammonium chloride)-2-propanol, dodecyltrimethyl ammonium chloride (DTAC), N-(1-(2,3-dioleoyloxy)propyl)-N,N,N-trimethylammonium chloride (DOTAP), N-(1-(2,3-dioleyloxy)propyl)-N,N,N-trimethylammonium chloride (DOTMA), dimethyldioctadecyl ammonium bromide (DDAB), N,N-dioleyl-N,N-dimethylammonium chloride (DODAC) and 1,2-dioleoyloxy-3-(N,N,N-trimethylamino)propane chloride (DOTAP). Preferably, the quaternary ammonium salts are dodecyltrimethyl ammonium bromide (DTAB), N-(3-chloro-2-hydroxypropyl)-N,N-dimethyldodecylammonium chloride, 1,3-Bis-(N,N-dimethyldodecylammonium chloride)-2-propanol.

In one preferred embodiment, a mono- and bis-quaternary ammonium salt are prepared using the method of T-S Kim et al., *J. Am. Oil Chem. Society* 73:1 67-71. Described therein are various mono- and bis-quaternary ammonium salts prepared using epichlorhydrin and various dichloro compounds (see, FIG. 3).

Various textiles are preferred to practice the invention. These include, but are not limited to, a fiber, a yarn or a natural or synthetic fabric. Various fabrics include, but are not limited to, a nylon fabric, a polyester, an acrylic fabric, NOMEX®, a triacetate, an acetate, a cotton, a wool and mixtures thereof. NOMEX is made of an aromatic polyamide material and is available from DuPont (Wilminington, Del.). NOMEX is used in fire fighting equipment.

Figure 4A:
FIG. 4 illustrates various equations setting forth possible mechanisms underlying the present invention.

Without being bound to any theory, it is believed that the amphipathic molecules, such as QAS are not damaged even though they become inactive with bacterial contact and are still biocidal as long as they can make contact to other microorganisms. It is believed that the QAS is inserted into microorganism cells, and is later covered by dead bacteria cells resulting in inactivation. Because the QAS are unable to contact new bacteria, there is no further biocidal activity. Although the biocidal activity of the QAS is diminished, they are still attached to the dye and therefore the textile. If the bacteria cells killed by the QAS can be removed, e.g. by laundering, the antimicrobial property can be refreshed or regenerated (see, FIG. 4A).

Figure 4B:
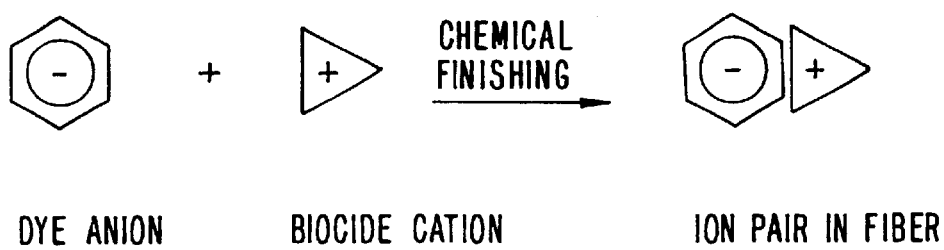
Figure 4B:
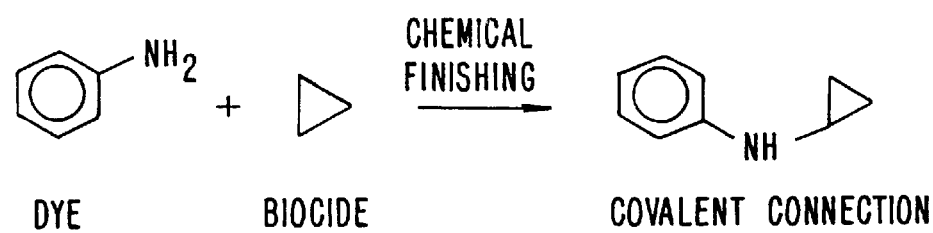
Figure 4B:

With reference to FIG. 4B, it is believed that the quaternary ammonium salts and anionic dyes can be used in a chemical interaction. Based on this chemistry, the fabrics dyed with anionic dyes can be treated with quaternary ammonium salts, and durable antimicrobial activities are achieved successfully.

Anionic dyes can interact with positive quaternary ammonium salts due to coulumbic forces, such an interaction can be reflected from the add-on rates of the salts on dyed and undyed fabrics, as well as the weight loss of the sample after repeated washing. Moreover, polyamide structures can form hydrogen bonds or van der Waals interactions with the quaternary ammonium salts, which can result in an add-on of the salts on undyed fabrics. Disperse dyes can covalently link to reactive quaternary ammonium salts, including, but not limited to, N-(3-chloro-2-hydroxypropyl)-N,N-dimethyldodecylammonium chloride.

There are various applications for the microbicidal textiles of the present invention. For instance, the microbicidal textiles can provide biocidal protective clothing to personnel in the medical area as well as in the related healthcare and hygiene area. The regenerable and reusable biocidal materials can replace currently used disposable, nonwoven fabrics as medical textiles, thereby significantly reducing hospital maintenance costs and disposal fees. The microbicidal properties of the textiles of the present invention can be advantageously used for women's wear, underwear, socks, and other hygienic purposes. In addition, the microbicidal properties can be imparted to carpeting materials to create odor-free and germ-free carpets. Moreover, all germ-free environments, such as required in biotechnology and pharmaceutical industry, would benefit from the use of the microbicidal textiles of the present invention to prevent any contamination from air, liquid, and solid media.

Thus, in another embodiment, the present invention relates to a process of regenerating an antimicrobial polymer, such as a textile. In this process, water is the refreshing agent for antimicrobial functions of quaternary ammonium salts.

In yet another embodiment, the present invention relates to a process for making a polymer antimicrobial, comprising: dyeing a polymer with a colorant to form a polymer having said colorant attached thereto; and attaching a antimicrobial agent to said colorant, thereby making said polymer antimicrobial. In a preferred embodiment, the polymer is a textile.

In this process various colorants can be used. These include, but are not limited to pigments and dye molecules. The colorants are used as connectors between the textile and the antimicrobial agents. The dye molecules suitable for different synthetic polymers have excellent washfastness and durability. The dyes which can be used include, but are not limited to, an acid dye, a disperse dye, a direct dye and a reactive dye. In a preferred embodiment, an acid dye is used. Suitable acid dyes include, but are not limited to, Acid Black dye, an Acid Blue dye, an Acid Orange dye, an Acid Red dye, an Acid Violet dye, and an Acid Yellow dye.

In another preferred embodiment, a disperse dye is used. Various disperse dyes are suitable for use in the present invention. These disperse dyes include, but are not limited to, Disperse Blue dyes, Disperse Yellow Dyes and Disperse red Dyes. Those skilled in the art will be aware of various other disperse dyes suitable for use in the present invention.

In certain embodiments, the colorants, such as dye molecules also contain auxochromes, such as sulfonic, hydroxyl and amino functional groups. These auxochromes facilitate the color and solubility requirements of the colorant.

Those of skill in the art will readily appreciate that the concentration of the various components of the aqueous treating solution can be widely varied depending upon the particular components employed and the results desired. Typically, the colorant is present at a concentration for an "on weight fabric" (o.w.f.) of about 0.1% to about 15%. More typically, the colorant is present at a concentration ranging from about 0.2% to about 5%, more preferably at a concentration ranging from about 0.5% to about 2%.

The polymer, such as a textile material, is dyed in the colorant solution at about 80° C. to about 100° C. for about 1 hour to about 3 hours. More typically, about 90° C. to about 95° C. for about 80 min. to about 90 min. The liquor ratio, which is the ratio of fabric to dye solution (w/w), ranges from about 1:100 to about 1:25, and more preferably about 1:75 to about 1:45, most preferably about 1:50. The pH of the dye bath is adjusted to about pH=1 to about pH=6, more preferably, pH=2.0 to about pH=5 with a weak acid, including, but not limited to, acetic acid. The dyed polymers, such as fabrics, are then washed with an AATCC standard detergent after dyeing and cured. The curing temperature is set to about 90° C. to about 150° C., more preferably 100° C. to about at 125° C., most preferably 115° C. to about 125° C. The cure time is about 5 min to about 30 mins, more preferably 10 min to about 20 minutes.

The antibacterial finishing bath is then prepared by dissolving an antimicrobial agent, such as a quaternary ammonium salt, in distilled water. The pH value is adjusted to about pH=1 to about pH=6, more preferably, pH=2.0 to about pH=5 with a weak acid, such as acetic acid. The dyed textile is dipped in the antibacterial agent solution, padded to a wet pick up of about 50% to about 120%, more preferably about 60% to about 100% and then cured at an elevated temperature for an extended period. The antimicrobial agent is typically present at a concentration ranging from about 0.1% to about 30% and, more preferably, at a concentration ranging from about 0.2% to about 10%.

In another embodiment, the textiles, such as fabrics, are dyed by an acid dye and then treated in a quaternary ammonium salt solution wherein the treatment is performed in a pressurized dyer or by padding and then curing at a high temperature. Another embodiment involves mixing the acid dye with a quaternary ammonium salt in a bath and directly dyeing or treating the fabric simultaneously.

When using the disperse dye, the treatment can be done by dyeing fabrics first with a disperse dye, then dipping the dyed fabrics in a quaternary ammonium salt solution and padding the fabrics to a wet pick-up rate of 60–120%. The fabrics are cured at about 150–170° C. for 5–15 minutes and then washed. Disperse dyes or pigments can be mixed with reactive quaternary ammonium salts under basic conditions (pH>10) in an aqueous solution. The mixture is stirred and warmed for about 30 minutes, and then diluted to 1% o.w.f. Fabrics can be either dipped into the solution, padded at a wet pick-up rate of 60–120%, and cure at 150–170° C. for about 5–30 minutes, or immersed in the solution in a pressure dyer, and treated at 120° C., 20 atm pressure for 30 minutes. The fabrics are then washed and dried and ready for testing.

In yet another embodiment, the present invention relates to a process for making a polymer antimicrobial, comprising: attaching a antimicrobial agent to said polymer, thereby making said polymer antimicrobial. Preferably, the polymer is a textile, and still more preferably, the textile is NOMEX or nylon. In this embodiment, the antimicrobial agent attaches directly to the textile with no colorant. The colorant can preferably be a disperse dye.

In another embodiment, the present invention relates to a process for making a polymer antimicrobial, said process comprising: dyeing a polymer with a solution containing a colorant and an antimicrobial agent to form an antimicrobial polymer. In this aspect, the colorant is preferably a disperse dye.

The invention will be described in greater detail by way of specific examples. The following examples ar e offered for illustrative purposes, and are not intended to limit the invention in any manner.

EXAMPLES

A. Materials and Methods

Nylon 6,6 filament Taffeta, #306A, was purchased from (Testfabrics Inc. Middlesex, N.J.) and was used after thoroughly being scoured with AATCC standard detergent 124. Acid Red 88, Acid Red 18, Acid Violet 7, Acid Blue 113 and Acid Orange 7 were purchased from (Aldrich Chem. Co., Milwaukee, Wis.). Dodecyltrimethyl ammonium bromide (DTAB) was purchased from Aldrich Chemical Company. Other QAS were prepared following the procedure as outlined in T. S. Kim et al., *J. Am. Oil Chem. Soc.,* 73: 67–71.

B. Dyeing

Nylon fabrics were dyed with 1% on weight fabric (o.w.f.) dye solutions at 95° C. for 90 min. The liquor ratio was 1:50, and the pH of the dye bath was adjusted to pH=3.5 with acetic acid. The dyed fabrics were washed with the AATCC standard detergent after dyeing and then cured at 120° C. for 15 minutes.

C. Antibacterial Finishing

The antibacterial finishing baths were prepared by dissolving quaternary ammonium salts in distilled water. The pH value was adjusted to pH=4 with acetic acid. The dyed nylon fabric was dipped in the antibacterial agent solution, padded to a wet pick up of about 60% and cured at an elevated temperature for an extended period.

D. Detergency Test

The finished fabric was washed in a Launder-Ometer, according to AATCC Test Method 61–1994 to evaluate the washing durability. One cycle of Launder-Ometer washing test by this AATCC Test Method is equivalent to about five machine washes in a home laundry practice.

E. Antibacterial Test

The antimicrobial properties were quantitatively evaluated against *Staphylococcus aureus,* ATCC 6538, a gram positive bacterium, and *Escherichia coli,* ATCC 2666, a gram negative bacterium. The protocol used followed AATCC Test Method 100-1993. Following the method, about one gram of circular fabric swatches was inoculated with 1.0±0.1 mL of inoculum in a 250 mL jar. The inoculum was a nutrient broth culture containing $1.0 \times 10^4$–$10^6$/mL clone forming units (CFU) of bacteria. After the swatches were contacted with bacteria for a varied time, 100 mL sterilized distilled water was poured into the jar to neutralize the activity. The jar was then vigorously shaken and the solution was diluted to $10^1$, $10^2$, $10^3$ and $10^4$. The diluted solutions were plated on nutrient agar and incubated for 18 hours at 37° C. The viable clones of bacteria in the agar plate were counted. The reduction rate in numbers of bacteria was calculated using the following equation.

Reduction rate in numbers of bacteria (%)=$A-B/A \times 100$ wherein
A=the numbers of bacteria counted from untreated fabrics
B=the numbers of bacteria counted from treated fabrics Example 1

This example illustrates the interactions between dyes and antimicrobial agents.

With reference to Table 1, three similar dodecyl quaternary ammonium salts with the same interactive sites, but different sizes were used as biocidal agents. Quaternary ammonium salts have positively charged nitrogen ions. It is believed these positively charged ions damage cell membranes, thus resulting in inactivation of the microorganisms. Beside the biocidal effects, the positively charged ions are able to establish ionic interactions with negatively charged groups such as those found in anionic dye classes. Such intermolecular interactions inside fibers can be utilized as binding forces to increase durability of the biocidal agents. Acid and direct dyes usually contain sulfonate groups, the anionic solubilizing groups that are interactive with the quaternary nitrogen.

Table 1 illustrates the results of the tests including the add-on rates of ammonium salts on dyed and undyed fabrics and weight losses after washing. The nylon fabrics were first dyed with two different acid dyes at concentration of 1% on weight fabric (o.w.f) and then treated with the quaternary ammonium salts. The margins of the differences between dyed and undyed fabrics are significant enough to exhibit the existence of the ionic intermolecular interactions. DTAB had the highest add-on rates on all of the tested samples because of the smallest molecular size and thus strong interactions with dyes. The monomer salt (see, FIG. 3), though smaller in size but relatively bulkier, had the lowest add-on rates on the fabrics in the three salts. Because of containing more positive charges and steric hindrance, the dimer salt (see, FIG. 3) behaved as in between the two smaller salts.

TABLE 1

Add-on rates of dyed and undyed fabrics

| Dye (%, owf) | Quat. salt | Add-on rate (%) | Add-on rate after 7 washes (%) | Total weight loss after the + 7 washes (%) |
|---|---|---|---|---|
| Acid Red 88 | Monomer | 1.78 | −1.87 | −0.09 |
| 1% | Dimer | 2.99 | −3.08 | −0.09 |
|  | DTAB | 3.35 | −3.39 | −0.04 |
| Acid Blue 113 | Monomer | 2.01 | −2.44 | −0.43 |
| 1% | Dimer | 2.29 | −2.54 | −0.25 |
|  | DTAB | 3.86 | −3.48 | 0.28 |
| Undyed | Monomer | 1.08 | −1.81 | −0.73 |
|  | Dimer | 2.73 | −3.20 | −0.47 |
|  | DTAB | 2.51 | −3.51 | −1.00 |

*Fabric samples were treated with 6% of quaternary salt solution at pH = 3.7 and cured at 120° C. for 30 minutes. Washing was conducted in a Launder-Ometer according to AATCC test method 61.

After extensive washing, the weight losses of the fabric swatches were even more significant than the add-on rates. The weight loss of a fabric sample is calculated based on its total weight change after the finishing and washing. Undyed fabrics lost weight more dramatically than dyed fabrics, in addition, they even became frayed during the tests, indicating departure of the salts from the fabric and reduction in abrasion resistance. Colorant (dye) and salt interactions were the major causes of the difference in mass change. The size of dyes can also play a role in the interaction with the salts, which can be seen from the add-on rates on Acid Blue 113 and Acid Red 88 dyed fabrics. The size of Acid Blue 113 is almost twice as much as the Acid Red 88, thus it could not hold much of the dimer quaternary ammonium salt in the limited space that is available for dye molecules and biocidal agent inside the fabrics.

Example 2

This example illustrates the effects of different dyes.

Nylon fabrics were challenged with different acid dyes shown in FIG. 1, and the monomer quaternary ammonium salt. The samples were dyed with 1% owf dye solutions and then treated with 6% of the salt solution to achieve a similar add-on rate of the salt. Table 2 shows the antimicrobial results of the samples against *E. coli* and *S. aureus* after repeated Launder-Ometer washes. Eventually all of the dyes displayed similar effects on the durability of the functions since structurally they are very close, which further confirms the proposed mechanisms. The control fabric all became shredded after seven washes. The results indicate that the treated fabrics were more effective against *S. aureus*.

TABLE 2

| | | % kill of bacteria after washing | | | |
|---|---|---|---|---|---|
| Dye | Bacterium | 10 washes | 13 washes | 14 washes | 16 washes |
| Acid Red 18 | E. coli | 100 | 99.5 | 93.3 | 83.3 |
| | S. aureus | 100 | 100 | 99.6 | 99.8 |
| Acid Red 88 | E. coli | 100 | 100 | 100 | 93.3 |
| | S. aureus | 100 | 100 | 100 | 99.9 |
| Acid Violet 7 | E. coli | 100 | 99.8 | 99.9 | 82.8 |
| | S. aureus | 100 | 100 | 99.9 | 99.9 |
| Acid Orange 7 | E. coli | 100 | 98.9 | 98.8 | 89.6 |
| | S. aureus | 100 | 100 | 100 | 99.9 |

In Table 2, the monomer salt was used with an add-on rate of about 3% for all of the samples. Bacteria exposure time was 18 hours.

Example 3

This example illustrates durability tests of the treated fabrics.

To better simulate the real practice of the functional fabrics, several testing procedures were evaluated. The first series of tests were carried out by using accelerated or gentle laundering methods after every bacteria exposure of the fabric samples. Both Launder-Ometer and Terg-0-Tometer were employed and AATCC test method-61 was followed as the washing procedure. The antibacterial effect of samples washed by Launder-Ometer was relatively low (Table 3) comparing to the ones washed by Terg-0-Tometer since the washing conditions of Launder-Ometer were much more vigorous, thus resulting in greater reduction of quaternary ammonium salts on the fabrics.

TABLE 3

| | Durability tests | | | |
|---|---|---|---|---|
| | Bacteria (*E. coli*) Reduction, % | | | |
| Time of | Add-on rate = 1.98 % | | Add-on rate = 3.14% | |
| washing | Terg-wash | Launder-wash | Terg-wash | Launder-wash |
| 1st | 100 | 100 | 100 | 100 |
| 2nd | 100 | 100 | 100 | 100 |
| 3rd | 100 | 100 | 100 | 100 |
| 4th | 100 | 72.0 | 100 | 80.0 |

TABLE 3-continued

| | Durability tests | | | |
|---|---|---|---|---|
| | Bacteria (*E. coli*) Reduction, % | | | |
| Time of | Add-on rate = 1.98 % | | Add-on rate = 3.14% | |
| washing | Terg-wash | Launder-wash | Terg-wash | Launder-wash |
| 5th | 99.7 | / | 99.9 | / |
| 6th | 85.0 | / | 84.0 | / |

Bacteria exposure time=18 hours, finishing conditions were same as Table 1.

Figure 5:
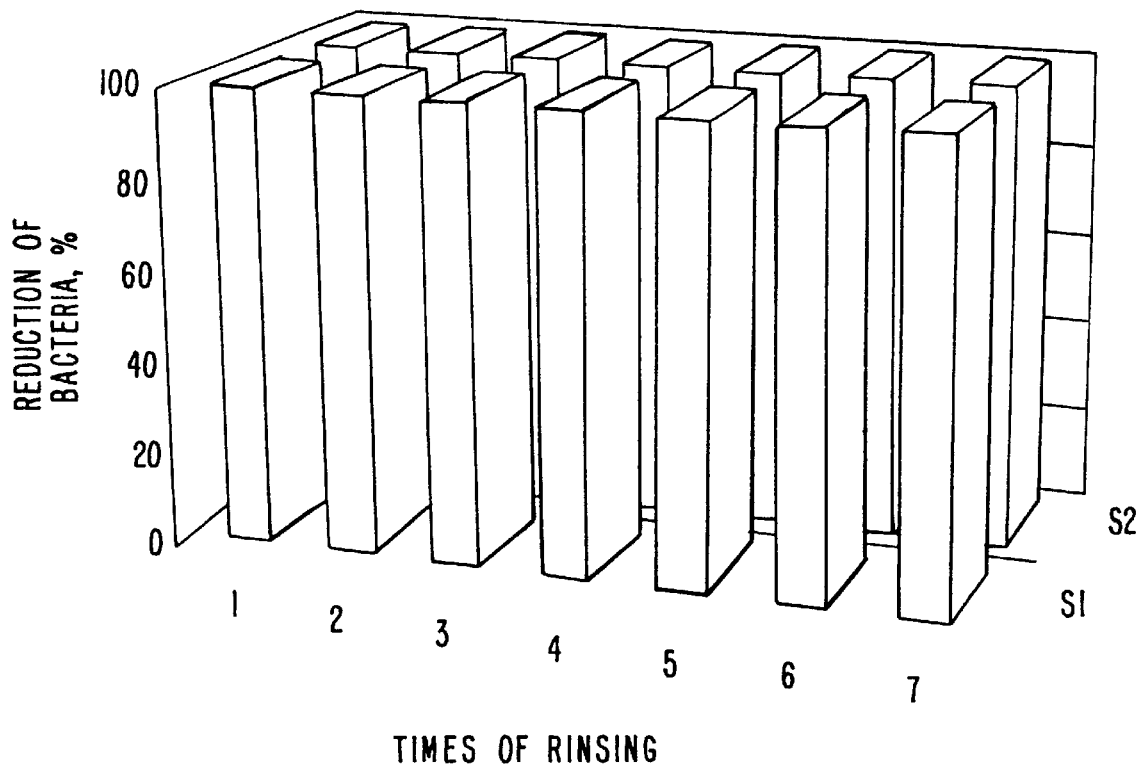
FIG. 5 illustrates the biocidal results after repeated rinsing and exposure to *E. coli.* (S1=fabric sample with an add-on of monomer 1.98%, S2=fabric sample with an add-on of monomer 3.14%).

The testing results shown in FIG. 5 were obtained by a series of continuous bacterium challenges on the same fabric samples. The fabric swatches were exposed to 1.0 mL of nutrient broth which contains $1.0 \times 10^6$ clone forming unit (CFU) of *E coli*, and after the previous exposure the samples were removed from the container and air-dried, then challenged with another 1.0 mL inoculum of the bacteria solution. During each exposure the fabric swatches were only rinsed once in a 100 mL of distilled water to free the active surface without using any chemicals. The samples were tested for seven exposures to the concentrated bacteria solutions, and still exhibited complete sterilization to the microorganisms.

Example 4

Figure 3:
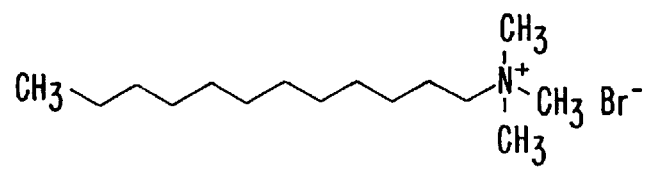
FIG. 3 illustrates examples of quaternary ammonium salts which are suitable for use in the present invention.
Figure 3:
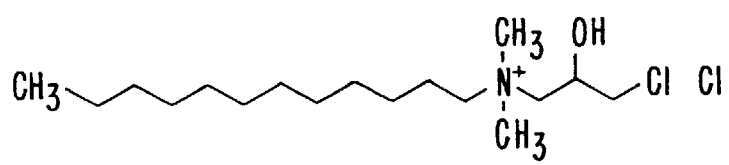
Figure 3:
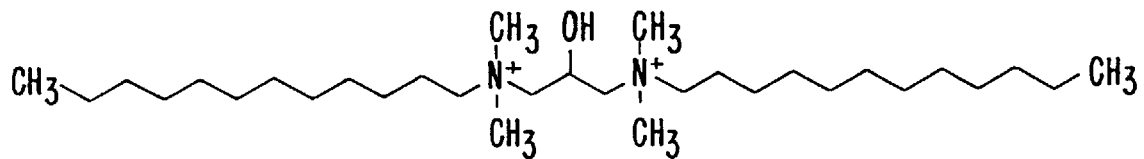

This example illustrate the finishing of acid dye dyed nylon 66 and nylon 6 with quaternary ammonium salts (see, FIG. 3, all species).

Nylon 66 (#306A, Taffeta, Testfabrics Inc., Middlesex, N.J.) and nylon 6 (#361 and #322, Testfabrics Inc.) fabrics were first dyed with 1% on weight fabric (o.w.f.) acid dyes such as Acid red 88, Acid violet 7 and Acid red 18, respectively, at 95° C. for 90 min. The liquor ratio was 1:50, and the pH of the dye bath was adjusted to pH=3.5 with acetic acid. The dyed fabric was then washed with AATCC standard detergent 124 and cured at 120° C. for 15 minutes. The finishing of the dyes and undyed fabrics was performed by dipping the samples in solution containing 8–10% of quaternary ammonium salts, padded to a wet pick up of about 60% and cured at 120° C. for 30 and 60 minutes respectively. The pH of the quaternary ammonium salt solution was adjusted to 4–5 with acetic acid. The treated fabrics were then washed and dried for testing.

Example 5

This example illustrates the antimicrobial properties which were quantitatively evaluated against *Staphylococcus aureus*, a gram positive bacteria and *Escherichia coli*, a gram negative bacteria, according to AATCC Test Method 100-1993.

In this procedure about one gram circular fabric swatches were inoculated with 1.0±0.1 mL of inocclum in a 250 mL jar. The inoculum was a nutrient broth culture containing over $1.0 \times 10^4$/mL clone forming units of bacteria. After the swatches were contacted with bacteria for 0.5, 1, 3, 7 or 18 hrs, 100 mL distilled water was poured into the jar. The jar was then vigorously shaken and the solution was diluted to $10^1$, $10^2$, $10^3$ and $10^4$. The diluted solutions were plated on nutrient agar and incubated for 18 hours at 37° C. The numbers of bacteria in the agar plate were counted. The reduction rate in the numbers of bacteria were reported based on log reduction. Six log reduction indicates a fabric kill of $10^6$ CFU bacteria by contact and is equivalent to 99.9999% kill. One log reduction equals 90% kill of bacteria.

TABLE 4

Results of acid finishing of acid red 88 dye dyed fabrics

| Fabric | % add-on after treatment | concentration of monomer quat salt | Curing conditions | Reduction of E. coli after 10 times washed |
|---|---|---|---|---|
| nylon 6,6 | 3.29 | 10 | 120° C., 60 mins. | 6 log |
| with | 2.87 | 10 | 120° C., 60 mins. | 6 log |
| (#361) | 3.03 | 10 | 120° C., 30 mins. | 6 log |
| dyed | 2.50 | 10 | 120° C., 30 mins. | 6 log |
| undyed | 2.30 | 10 | 120° C., 60 mins. | 6 log |
| nylon 6,6 | 1.91 | 10 | 120° C., 60 mins. | 3 log |
| (#361) | 2.88 | 10 | 120° C., 30 mins. | 6 log |
|  | 1.90 | 10 | 120° C., 30 mins. | 3 log |
| Dyed Nylon 6 | 2.85 | 8 | 120° C., 30 mins. | 6 log (8 washes) |
| (#322) | 2.90 | 8 | 120° C., 30 mins. | 1 log |
| Undyed Nylon 6 | 0.40 | 8 | 120° C., 30 mins. | 6 log (8 washes) |
| (#322) | 0.38 | 8 | 120° C., 30 mins. | TNTC |

Example 6

This example illustrate the finishing of disperse dye dyed manufactured fabrics such as Nylon 66, Nylon 6, triacetate, acetate, polyester and Nomex with the monomer quaternary ammonium salt (see, FIG. 3).

10.00 grams of polyester fabric were dyed with Disperse Blue 1 at a concentration of 1% on weight fabric and in a liquid:fabric ratio of 10:1, and the dyed fabrics were washed and dried for finishing. The finishing process is implemented by immersing the fabrics in a solution containing 10% of the monomer quaternary ammonium salt. The fabrics were then padded to a wet pick of about 60%, cured at 150° C. for 15 minutes, rinsed 3 times and dried at room temperature.

TABLE 5

Results of Disperse Blue 1 dyed and monomer finished polyester fabrics.

| Fabric | | % add-on after treatment | | Reduction of E. coli after | | |
|---|---|---|---|---|---|---|
| | | before rinse | after rinse | 0 wash | 1 wash | 2 wash |
| polyester | dyed | 10.04 | −0.39 | 6 log | 6 log | 0 log |
| (knit) | undyed | 6.18 | −0.21 | 3 log | 1 log | TNTC |
| polyester | dyed | 11.8 | −0.38 | 6 log | 6 log | 1 log |
| (twill) | undyed | 8.75 | −0.05 | 3 log | 1 log | TNTC |
| polyester | dyed | 5.77 | −0.48 | 6 log | 2 log | 3 log |
| (#767h) | undyed | 4.38 | −0.23 | 2 log | 2 log | 1 log |
| polyester | dyed | 6.61 | −0.63 | 6 log | 6 log | 3 log |
| (#755h) | undyed | 4.77 | −0.24 | 2 log | 2 log | 1 log |
| polyester | dyed | 2.63 | −0.41 | 6 log | 6 log | 2 log |
| (taffeta) | undyed | 2.81 | −0.13 | 2 log | 1 log | TNTC |

Example 7

This example illustrate the finishing of manufactured fabrics Nylon 66, Nylon 6, triacetate, acetate, polyester and Nomex with mixed products of disperse dyes and the monomer quaternary ammonium salt (see, FIG. 3).

A finishing solution containing a reacted product of Disperse Yellow 7 and mono-quaternary ammonium salt was prepared by dissolving one part Disperse Blue 1 and 1.5 part of mono-quaternary ammonium salt in 100 mL 0.1 N NaOH solution, and then reacted at 100° C. for 30 minutes. The fabrics were immersed in 50 mL of the solution and finished at 120° C. under pressure of 20 kg/cm$^2$ for 30 minutes in a pressure reactor. After treatment the fabrics were rinsed and dried for testing.

In this embodiment, the treatment can be implemented by dipping fabrics in a solution containing 10–50% of the product of a disperse dye or pigment with a reactive quaternary ammonium salt such as the monomer, then the fabrics are padded to a wet pick up rate of 60–120% and cured at 150–170° C. for 5–15 minutes. The treated fabrics are washed and dried for property tests. The expression "TNTC" means "too numerous to count."

TABLE 6

Results of fabrics treated by the product of Disperse Yellow 7 and monomer

| Fabric* | % add-on^ | Reduction of E. coli afer rinse |
|---|---|---|
| Polyester twill (D+ Q) | 0.5 | 6 log |
| Polyester twill (Q) | −4.2 | TNTC |
| Polyester knit (D+ Q) | 1.4 | 6 log |
| Polyester knit (Q) | −3.5 | TNTC |
| Polyester #767 (D + Q) | −1.3 | 6 log |
| Polyester #767 (Q) | −4.5 | TNTC |

*D + Q represents a fabric treated by a product of a dye and a reactive quaternary ammonium salt; Q represents treatment only by quaternary ammonium salt with the dye.
^negative numbers are caused by losing yarn from the fabric swatches Example 8

This example illustrate the antibacterial finishing of disperse dye dyed fabrics and undyed such as Nylon 66, Nylon 6, triacetate, acetate, Nomex, and polyester/cotton blends with the monomer quaternary ammonium salt. 10.00 grams of polyester fabrics (#) were dyed with Disperse Blue 1 at a concentration of 1% on weight of bath (o.w.b.) and in a liquid:fabric ratio of 10:1, and the dyed fabrics, together with same amount of undyed fabrics were immersed in 50 mL of a finishing solution containing 10% of monomer at pH=5–12. The fabrics were then padded to a wet pick of about 60%, cured at 150° C. for 15 minutes, rinsed 3 times and dried at room temperature.

TABLE 7

Results of disperse blue 1 dyed and monomer finished fabrics

| Fabric | | % add-on after treatment | | Reduction of E. coli | | |
|---|---|---|---|---|---|---|
| | | before rinse | after rinse | After treatment | after one rinse | After two rinses |
| Acetate | dyed | 1.90 | −0.63 | 6 log | 3 log | 2 log |
| (taffeta) | undyed | 2.00 | −0.42 | 6 log | 6 log | 6 log |
| Acetate | dyed | 5.58 | −0.74 | 6 log | 3 log | 3 log |
| (#154) | undyed | 3.49 | −0..57 | 6 log | 6 log | 6 log |
| Nylon | dyed | 6.69 | 1.37 | 6 log | 6 log | 6 log |
| 66 | undyed | 5.37 | 0.70 | 6 log | 6 log | 6 log |
| (#361) | | | | | | |
| Nylon | dyed | 3.22 | 1.23 | 6 log | 6 log | 6 log |
| 66 | undyed | 3,78 | 0.76 | 6 log | 6 log | 6 log |
| (#306a) | | | | | | |
| Nylon 6 | dyed | 6.00 | 2.22 | 6 log | 6 log | 6 log |
| (#322) | undyed | 5.01 | 1.83 | 6 log | 6 log | 6 log |

TABLE 7-continued

Results of disperse blue 1 dyed and monomer finished fabrics

| Fabric | | % add-on after treatment | | Reduction of E. coli | | |
|---|---|---|---|---|---|---|
| | | before rinse | after rinse | After treatment | after one rinse | After two rinses |
| Tri-acetate (#116) | dyed | 1.39 | −0.61 | 6 log | 6 log | 6 log |
| | undyed | 1.33 | −0.87 | 6 log | 6 log | 6 log |
| Tri-acetate (#116) | dyed | 1.39 | −0.61 | 6 log | 6 log | 6 log |
| | undyed | 1.33 | −0.87 | 6 log | 6 log | 6 log |
| Nomex IIIa | Navy Blue | 8.96 | 0.75 | 6 log | 6 log | 6 log |
| Plain | Yellow | 10.4 | 1.00 | 6 log | 6 log | 6 log |
| | Undyed | 8.49 | 1.77 | 6 log | 6 log | 6 log |

All publications, patents and patent applications mentioned in this specification are herein incorporated by reference into the specification in their entirety for all purposes.

Although the invention has been described with reference to preferred embodiments and examples thereof, the scope of the present invention is not limited only to those described embodiments. As will be apparent to persons skilled in the art, modifications and adaptations to the above-described invention can be made without departing from the spirit and scope of the invention, which is defined and circumscribed by the appended claims.

What is claimed is:

1. An antimicrobial composition, comprising:
   a) a polymer coated with an acid dye; and
   b) an antimicrobial agent attached to said acid dye, wherein said antimicrobial agent is a quaternary ammonium salt; and wherein said antimicrobial composition has more durable antimicrobial activity than a composition with the antimicrobial agent attached directly to the polymer thereof.

2. An antimicrobial composition according to claim 1, wherein said polymer is a textile.

3. An antimicrobial composition according to claim 2, wherein said textile is a member selected from the group consisting of a fiber from plants, a polymer from animals, a natural organic polymers, a synthetic organic polymer and an inorganic substance.

4. An antimicrobial composition according to claim 3, wherein said textile is a member selected from the group consisting of cellulose, cotton, linin, hemp, jute and ramie, wool, mohair, vicuna, silk, rayon, lyocell, acetate, triacetate and azlon, acrylic, aramid, nylon, olefin, polyester, spandex, vinyon, vinal and graphite, an aromatic polyamide, metallic, ceramic and mixtures thereof.

5. An antimicrobial composition according to claim 1, wherein said polymer is a plastic.

6. An antimicrobial composition according to claim 5, wherein said plastic is a member selected from the group consisting of polyethylene, polypropylene, polystyrene, and polyvinylchloride polyamideimide, polyethersulfone, polyarylsulfone, polyetherimide, polyarylate, polysulfone, polycarbonate and polystyrene, polyetherketone, polyetheretherketone, polytetrafluoroethylene, nylon-6,6, nylon-6,12, nylon-11, nylon-12, acetal resin, polypropylene, and polyethylene.

7. An antimicrobial composition according to claim 1, wherein said quaternary ammonium salt is a member selected from the group consisting of dodecyltrimethyl ammonium bromide, N-(3-chloro-2-hydroxypropyl)-N,N-dimethyldodecylammonium chloride, 1,3-Bis-(N,N-dimethyldodecylammonium chloride)-2-propanol, dodecyl-trimethyl ammonium chloride, N-(1-(2,3-dioleoyloxy)propyl)-N,N,N-trimethylammonium chloride, N-(1-(2,3-dioleyloxy)propyl)-N,N,N-trimethylammonium chloride, dimethyldioctadecyl ammonium bromide, N,N-dioleyl-N,N-dimethylammonium chloride and 1,2-dioleoyloxy-3-(N,N,N-trimethylamino)propane chloride.

8. An antimicrobial composition according to claim 1, wherein said dye is a member selected from the group consisting of an Acid Black dye, an Acid Blue dye, an Acid Orange dye, an Acid Red dye, an Acid Violet dye, and an Acid Yellow dye.

9. An antimicrobial composition according to claim 8, wherein said Acid Red dye is a member selected from the group consisting of Acid Red 1, Acid Red 4, Acid Red 27, Acid Red 71, Acid Red 88, Acid Red 106, Acid Red 114, Acid Red 150, Acid Red 151 and Acid Red 183.

10. An antimicrobial composition according to claim 8, wherein said Acid Violet dye is a member selected from the group consisting of Acid Violet 5, Acid Violet 7, Acid Violet 9, Acid Violet 17 and Acid Violet 19.

11. An antimicrobial composition according to claim 8, wherein said Acid Blue dye is a member selected from the group consisting of Acid Blue 9, Acid Blue 25, Acid Blue 29, Acid Blue 45, Acid Blue 80, Acid Blue 110, Acid Blue 147 and Acid Blue 161.

12. An antimicrobial composition according to claim 8, wherein said Acid Orange dye is a member selected from the group consisting of Acid Orange 5, Acid Orange 6, Acid Orange 8, Acid Orange 10, Acid Orange 51 and Acid Orange 63.

13. An antimicrobial composition according to claim 8, wherein said Acid Yellow dye is a member selected from the group consisting of Acid Yellow 9, Acid Yellow 17, Acid Yellow 23, Acid Yellow 24, Acid Yellow 25, Acid Yellow 29, Acid Yellow 38, Acid Yellow 40 and Acid Yellow 65.

14. An antimicrobial composition according to claim 8, wherein said Acid Black dye is Acid Black 48.

15. The antimicrobial composition according to claim 1, wherein said dye is coated with a concentration of about 0.1% to about 15% on weight fabric.

16. A durable antimicrobial composition comprising:
   a) a polymer having a coated dye, wherein said coated dye is an acid dye; and
   b) an antimicrobial agent attached to said dye, wherein said antimicrobial agent is a quaternary ammonium salt, said dye is a bridge between said polymer and said antimicrobial agent and wherein said antimicrobial composition has more durable antimicrobial activity than a composition with the antimicrobial agent attached directly to the polymer thereof.

17. The antimicrobial composition according to claim 16, wherein said dye is coated with a concentration of about 0.1% to about 15% on weight fabric.

18. A process for making a polymer antimicrobial, said process comprising:
   a) dyeing a polymer with a dye to form a dye coated polymer, wherein said dye is an acid dye; and
   b) attaching an antimicrobial agent to said dye, wherein said antimicrobial agent is a quaternary ammonium salt, thereby making said polymer antimicrobial, and wherein said antimicrobial polymer has more durable antimicrobial activity than a composition with the antimicrobial agent attached directly to the polymer thereof.

19. A process for making a polymer antimicrobial according to claim 18, wherein said polymer is a textile.

20. A process for making a polymer antimicrobial according to claim 19, wherein said textile is a member selected from the group consisting of a fiber from plants, a polymer from animals, a natural organic polymer, a synthetic organic polymer and an inorganic substance.

21. A process for making a textile material antimicrobial according to claim 20, wherein said textile is a member selected from the group consisting of cellulose, cotton, linin, hemp, jute and ramie, wool, mohair, vicuna, silk, rayon, lyocell, acetate, triacetate and azlon, acrylic, aramid, nylon, olefin, polyester, spandex, vinyon, vinal and graphite, an aromatic polyamide, metallic, ceramic and mixtures thereof.

22. A process for making a polymer antimicrobial according to claim 18, wherein said polymer is a plastic.

23. A process for making a polymer antimicrobial according to claim 22, wherein plastic is a member selected from the group consisting of polyethylene, polypropylene, polystyrene, and polyvinylchloride polyamideimide, polyethersulfone, polyarylsulfone, polyetherimide, polyarylate, polysulfone, polycarbonate and polystyrene, polyetherketone, polyetheretherketone, polytetrafluoroethylene, nylon-6,6, nylon-6,12, nylon-11, nylon-12, acetal resin, polypropylene, and polyethylene.

24. A process for making a polymer antimicrobial according to claim 18, wherein said dye is a member selected from the group consisting of an Acid Black dye, an Acid Blue dye, an Acid Orange dye, an Acid Red dye, an Acid Violet dye, and an Acid Yellow dye.

25. A process for making a polymer antimicrobial according to claim 24, wherein said Acid Violet dye is a member selected from the group consisting of Acid Violet 5, Acid Violet 7, Acid Violet 9, Acid Violet 17 and Acid Violet 19.

26. A process for making a polymer antimicrobial according to claim 24; wherein said Acid Blue dye is a member selected from the group consisting of Acid Blue 9, Acid Blue 25, Acid Blue 29, Acid Blue 45, Acid Blue 80, Acid Blue 110, Acid Blue 147 and Acid Blue 161.

27. A process for making a polymer antimicrobial according to claim 24, wherein said Acid Orange dye is a member selected from the group consisting of Acid Orange 5, Acid Orange 6, Acid Orange 8, Acid Orange 10, Acid Orange 51, and Acid Orange 63.

28. A process for making a polymer antimicrobial according to claim 24, wherein said Acid Yellow dye is a member selected from the group consisting of Acid Yellow 9, Acid Yellow 17, Acid Yellow 23, Acid Yellow 24, Acid Yellow 25, and Acid Yellow 29, Acid Yellow 38, Acid Yellow 40, and Acid Yellow 65.

29. A process for making a textile material antimicrobial according to claim 24, wherein said Acid Black dye is Acid Black 48.

30. An antimicrobial composition according to claim 18, wherein said quaternary ammonium salt is a member selected from the group consisting of dodecyltrimethyl ammonium bromide, N-(3-chloro-2-hydroxypropyl)-N,N-dimethyldodecylammonium chloride, 1,3-Bis-(N,N-dimethyldodecylammonium chloride)-2-propanol, dodecyltrimethyl ammonium chloride, N-(1-(2,3-dioleoyloxy)propyl)-N,N,N-trimethylammonium chloride, N-(1-(2,3-dioleyloxy)propyl)-N,N,N-trimethylammonium chloride, dimethyldioctadecyl ammonium bromide, N,N-dioleyl-N,N-dimethylammonium chloride and 1,2-dioleoyloxy-3-(N,N,N-trimethylamino)propane chloride.

31. A process for making a polymer antimicrobial according to claim 18, wherein said dye is applied with a concentration of about 0.1% to about 5% on weight fabric.

32. A process for making a polymer antimicrobial, said process comprising:

attaching a dye to a polymer, wherein said dye is an acid dye; and, attaching an antimicrobial agent to said dye, wherein said antimicrobial agent is a quaternary ammonium salt, thereby making said polymer antimicrobial, and wherein said antimicrobial polymer has more durable activity than a composition with the antimicrobial agent attached directly to the polymer thereof.

33. A process for making a polymer antimicrobial according to claim 32, wherein said polymer is a member selected from the group consisting of an aromatic polyamide and nylon.

* * * * *